Nov. 19, 1929.  G. E. A. HALLETT  1,736,261
FLUID SEAL FOR INTERMITTINGLY REGISTERING CONDUITS
Filed July 31, 1926
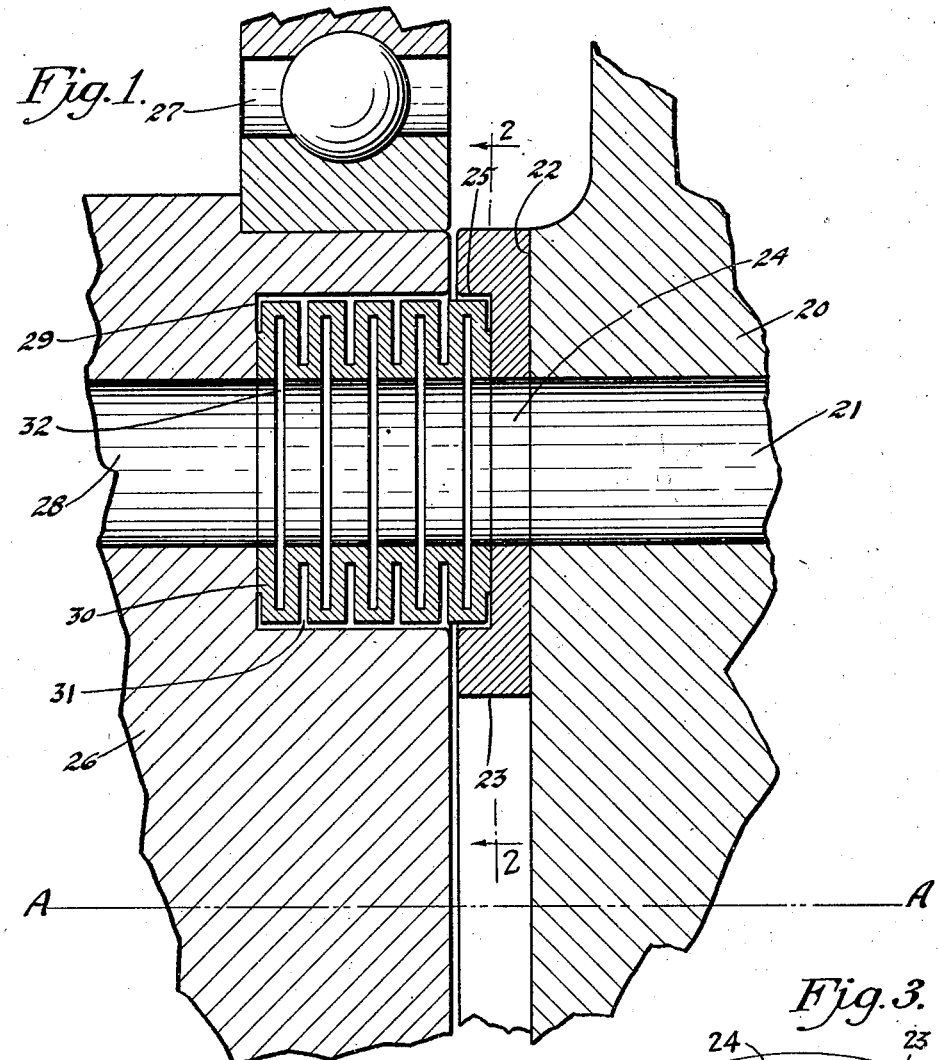
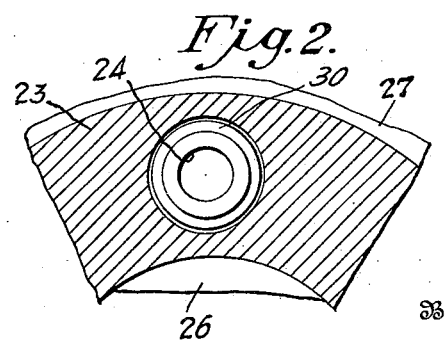
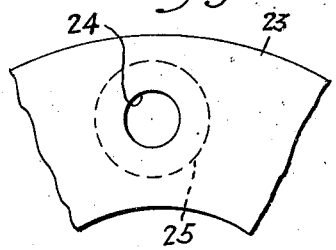

Patented Nov. 19, 1929

1,736,261

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

FLUID SEAL FOR INTERMITTINGLY REGISTERING CONDUITS

Application filed July 31, 1926. Serial No. 126,296.

This invention appertains to apparatus comprising members having juxtaposed parallel surfaces relatively movable past each other, each of said members having a fluid conduit adapted at times to register with the other.

The principal object of the invention is to seal effectively, without undue friction, the ends of the conduits in order to prevent escape of fluid to the space between the juxtaposed surfaces, permitting it to flow only from one conduit to the other when said conduits register.

Further objects and advantages will be apparent from the following description, reference being had to the accompanying drawing, wherein a preferred embodiment of the invention is clearly shown.

Fig. 1 is a section showing the valve in full open position.

Fig. 2 is a section on a plane at right angles to the section of Fig. 1, and

Fig. 3 is an elevation showing a detail of valve member 23, looking at the non-countersunk face.

In the drawing, numeral 20 designates a member, which may be deemed to be stationary, having a conduit 21. The face 22 of the stationary member 20 is ground to provide an even surface, which serves as a seat for a sliding valve.

Numeral 23 designates a valve in the form of an annulus, which is adapted to rotate about the axis designated by the line A—A and slides in contact with the face 22. The face of the valve 23, which engages with the ground face 22 of member 20, is also ground smooth, so that a good joint between these two members is ensured. Valve 23 is provided with a port 24 counterbored at 25 from the back of the valve.

The member 26 is adapted to rotate about the axis, designated by line A—A, in ball bearings 27; a conduit 28 is provided in the rotatable member 26, said member having a counterbore 29 concentric with the conduit, and adapted to register with the counterbore 25 of valve 23. Conduit 28 is so located in the member 26 that upon rotation thereof its orifice may be brought into alignment with the orifice of conduit 21 in stationary member 20.

An endwise expansible tubular member, in form of a bellows 30, constituting a seal, is positioned in the counterbored cavities 25 and 29 of the valve 23 and rotatable member 26, respectively, said bellows being inserted between the valve 23 and the rotatable member 26 under initial tension. This bellows 30 may be constructed in any suitable manner. The form illustrated consists of a metallic sleeve or tube having outer and inner peripheral grooves 31 and 32, respectively, the planes of the outer grooves lying between the planes of the inner grooves, thus forming an endwise elastic structure machined from solid metal. The opening through said bellows tube serves as a continuation of the conduit 28.

The bellows 30 not only forms a connecting duct between conduit 28 and port 24 of member 26 and valve 23, but it may also form a driving connection between the said member 26 and the valve 23, so that valve 23 is rotated with the member 26, or is maintained with its port 24 always in registration with conduit 28.

When fluid is forced into conduit 28 under pressure, and the valve port 24 registers with conduit 21, the fluid will of course pass into conduit 21. If the pressure of the fluid flowing through the passage is substantially low, the valve will be adequately pressed against its valve seat (surface 22) by the elastic expansion force of the bellows. When the pressure of the fluid in port 28 increases, it tends to still further expand the bellows, thereby exerting increased pressure on the valve 23 and, consequently, pressing said valve more tightly against the valve seat or surface 22 of member 20, reducing the likelihood of any fluid leaking past the valve. Thus it will be seen that the pressure of the valve 23 against the valve seat surface 22 will vary directly according to variations in the pressure of the fluid in conduit 28.

The invention has been described as applicable to prevent leakage of fluid passing from a duct in a rotating member into a duct in a nonrotating member, as in a hydraulic power transmission mechanism; but it will be clear that it is applicable to any two ported members the ported surfaces of which have a relatively sliding movement with respect to each other such that the ports will, in certain positions, register.

While the form of embodiment of the invention as herein disclosed constitutes a preferred form, it is to be understood that other forms might be adopted, all coming within the scope of the claims which follow.

What is claimed is:

1. The combination of a pair of members having opposed parallel adjacent faces relatively movable past one another, each member having a conduit adapted to register with the conduit of the other, and one of said members having a counterbore forming an enlargement of its conduit at the end adjacent the other member, means for preventing the escape of fluid between said opposed faces comprising an endwise expansible tubular seal seated in the counterbore, a ported valve engaged by the seal to hold its port in registration with the conduit of the member carrying the seal, said valve having the face opposite the seal in slidable engagement with the other member.

2. The combination as defined in claim 1 wherein the ported valve has a counterbore in which one end of the tubular seal is engaged.

3. The combination as defined in claim 1 wherein the seal consists of an elastic expansible bellows exerting an elastic force against said ported valve.

In testimony whereof I affix my signature.

GEORGE E. A. HALLETT.